United States Patent
Jung

(10) Patent No.: US 9,390,325 B2
(45) Date of Patent: Jul. 12, 2016

(54) APPARATUS FOR RECOGNIZING IRIS AND OPERATING METHOD THEREOF

(71) Applicant: IRIS ID, INC., Seoul (KR)

(72) Inventor: Sehhwan Jung, Plainsboro, NJ (US)

(73) Assignee: IRIS ID, INC, Seoul (KR)

( * ) Notice: Subject to any disclaimer, the term of this patent is extended or adjusted under 35 U.S.C. 154(b) by 0 days.

(21) Appl. No.: 14/555,295

(22) Filed: Nov. 26, 2014

(65) Prior Publication Data
US 2016/0148047 A1 May 26, 2016

(51) Int. Cl.
*G06K 9/00* (2006.01)
*G06T 5/00* (2006.01)
*G06T 5/20* (2006.01)

(52) U.S. Cl.
CPC .......... *G06K 9/00604* (2013.01); *G06K 9/0061* (2013.01); *G06K 9/00617* (2013.01); *G06T 5/002* (2013.01); *G06T 5/20* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 6,320,610 B1* | 11/2001 | Van Sant | ................ | G02B 26/10 348/143 |
| 6,714,665 B1* | 3/2004 | Hanna | ...................... | G06K 9/00 382/106 |
| 7,665,846 B2* | 2/2010 | Campin | ............... | A61B 3/0083 351/206 |
| 2005/0286802 A1* | 12/2005 | Clark | ..................... | H04N 5/232 382/286 |
| 2006/0029262 A1* | 2/2006 | Fujimatsu | .......... | G07C 9/00158 382/117 |
| 2006/0177145 A1* | 8/2006 | Lee | .......................... | G06K 9/40 382/255 |
| 2007/0036397 A1* | 2/2007 | Hamza | ................. | G06K 9/0061 382/117 |
| 2008/0075335 A1* | 3/2008 | Martin | ............... | G06K 9/00604 382/117 |
| 2010/0142765 A1* | 6/2010 | Hamza | .................. | G06K 9/036 382/117 |
| 2014/0201126 A1* | 7/2014 | Zadeh | .................... | G06K 9/627 706/52 |

* cited by examiner

*Primary Examiner* — Nancy Bitar
(74) *Attorney, Agent, or Firm* — Heidi Eisenhut; Loza & Loza, LLP

(57) ABSTRACT

An apparatus for recognizing an iris and an operating method thereof are provided. The iris recognition apparatus recognizing an iris of an eye includes an image capturing unit to acquire an iris image of an eye, and a controller to assess the focus quality of an iris region in the iris image and then determine an iris recognition target image.

7 Claims, 8 Drawing Sheets

APPARATUS FOR RECOGNIZING IRIS AND OPERATING METHOD THEREOF

BACKGROUND

The present disclosure relates to an apparatus for recognizing an iris and an operating method thereof, and particularly, to an apparatus for recognizing an iris and an operation method thereof capable of efficiently and effectively recognizing the iris in acquired iris images.

In many cases, electronic products such as computers and mobile phones include the personal information of a user. Recently, electronic commerce using this personal information tends to be widely spread. Accordingly, these devices need to ensure the personal information. It can only be accessed by the original user and they are required to accurately identify a user. To this end, ID and password are commonly used by people. However, such a scheme has limitations with respect to personal information protection and anti-hacking. So various alternatives have been proposed to overcome these issues.

As one of them, many kinds of biometric technologies are being gradually commercialized. Biometric technologies are used to identify users based on biological and behavioral characteristics. In particular, fingerprint recognition technology has been incorporated to some mobile phones. They are popular and widely used. However, easy spoofing of fingerprint may threaten the data security of personal information. Thus, an apparatus for recognizing iris has received attention as an alternative method of addressing such limitation.

Iris recognition technology uses the pattern on the iris of a person's eye to check the identity of the person. It has an advantage over fingerprint in that it is more difficult to spoof.

As well, high security can be achieved using highly accurate iris recognition technology. By the way, the accuracy of iris recognition technology is highly dependent on the inherent iris image quality. One of most important quality factors of iris image is focus. So it is critical to assess the focus quality to achieve high accuracy of iris recognition.

Several known techniques have been used for the assessment of image focus quality. They are based on wavelet, convolution kernel, sobel edge and image variance. However, some of these techniques have difficulty in accurately assessing the focus quality of the iris image and have high computational complexity. Some of them are not robust to image brightness or the size of iris in an image, which results in difficulty in assessing the focus quality accurately. They assess the entire image or fixed partial areas in the image, which in turn may affect the accuracy of focus assessment for the iris in the image because other objects such as eyeglasses frame, eyebrow or eyelashes in the image may have an impact on the focus assessment. When the imaging target is an iris, for the purpose of iris recognition, it is important that iris recognition systems should be designed to check if the iris in the image is in good focus.

SUMMARY

Embodiments provide an iris recognition apparatus and an operating method thereof capable of accurately assessing focus quality of an iris of the subject being identified in real time and improving the accuracy of iris recognition.

In one embodiment, an iris recognition apparatus recognizing iris of an eye includes: an image capturing unit which obtains an iris image of an eye; and a controller which assesses focus quality of only iris region in the iris image and determines whether the captured image is suitable for iris recognition.

The controller includes an iris image cropping unit which produces a cropped iris image. The iris image cropping unit searches for iris position in the iris image and produces the cropped iris image based on the iris position.

The controller includes a Laplacian image generating unit which produces a Laplacian image based on the cropped iris image. The Laplacian image generating unit creates a blurred image of the cropped iris image using a Gaussian filter and then produces the Laplacian image by computing pixel-by-pixel difference between the blurred image and the cropped iris image.

The controller includes an entropy computing unit which calculates entropy value of the Laplacian image and assesses the focus quality of the iris region. The entropy computing unit creates a histogram of the Laplacian image and calculates the entropy value. The entropy computing unit may normalize the entropy value to get a focus score in the range of 0 to 100.

In another embodiment, an operating method of an iris recognition apparatus includes: capturing an image sequence of the eye; and assessing the focus quality of an iris region for the each image of image sequence; and selecting a specific target image for iris recognition.

The operating method may further include capturing an iris image of the subject again when the captured iris image is not properly focused for iris recognition.

The operating method may further include selecting an iris image which has the highest focus value of the iris region from the captured iris images and performing the iris recognition.

The details of embodiments are set forth in the accompanying drawings and the description below. Other features will be apparent from the description and drawings, and from the claims.

DETAILED DESCRIPTION OF THE EMBODIMENTS

Figure 1:
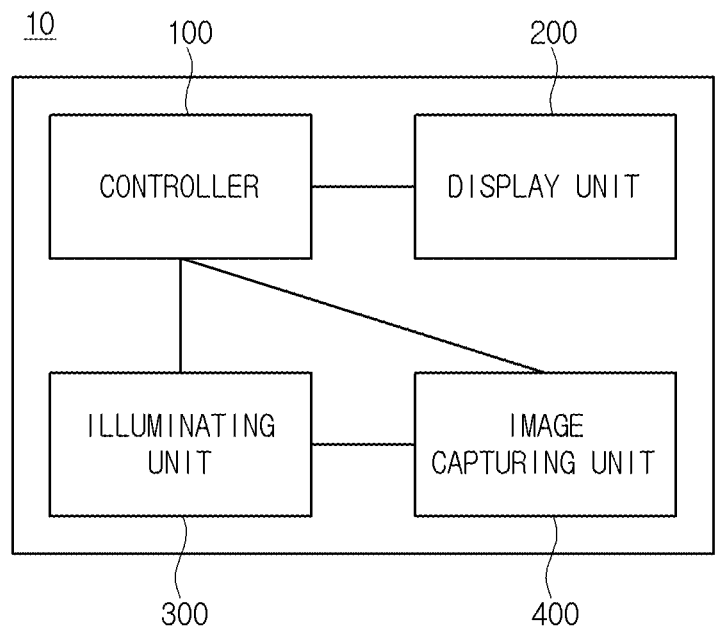
FIG. 1 is a block diagram of an iris recognition apparatus according to an embodiment.

Reference will now be made in detail to the embodiments of the present disclosure, examples of which are illustrated in the accompanying drawings.

Hereinafter, embodiments of the present invention will be described in detail with reference to the accompanying drawings so that the present invention can be easily realized by those skilled in the art. The present invention can be practiced in various ways and is not limited to the embodiments described herein. In the drawings, parts which are not related to the description are omitted to clearly set forth the present invention and similar elements are denoted by similar reference symbols throughout the specification.

In addition, when an element is referred to as "comprising" or "including" a component, it does not preclude another component but may further include the other component unless the context clearly indicates otherwise.

FIG. 1 is a block diagram of an iris recognition apparatus 10 according to an embodiment.

As shown in FIG. 1, the iris recognition apparatus 10 includes an illuminating unit 300, an image capturing unit 400, a controller 100 and a display unit 200.

The illuminating unit 300 illuminates the eye including an iris which is the iris recognition target.

The illuminator of the illuminating unit 300 may be near infrared (NIR) with wavelengths in the range of about 700 nm to about 900 nm. According to detailed embodiments, the iris recognition apparatus 10 may include multiple illuminating devices. The image capturing unit 400 obtains iris images and the images captured by the image capturing unit 400 may be an image sequence or single image.

The images captured by the image capturing unit 400 are used for the iris recognition.

Accordingly, the image capturing unit 400 is required to obtain high quality images in a narrow range for the iris recognition. Therefore, the image capturing unit 400 may include a lens which has a relatively narrow angle of view. At this point, in a detailed embodiment, the image capturing unit 400 may be a camera. In another detailed embodiment, the image capturing unit 400 may be an image sensor or another apparatus capable of capturing the iris images. Furthermore, in a detailed embodiment, the image capturing unit 400 may further include an additional image capturing module to obtain images of the eye of the subject in relatively wider range. Namely, the additional image capturing module may include a lens having a wider angle of view than that of the lens which is used to capture the images for the iris recognition.

The display unit 200 acts as user interface and may display images captured by the image capturing unit 400.

The controller 100 controls operations of the illuminating unit 300, the image capturing unit 400 and the display unit 200. In detail, the controller 100 analyzes the images captured by the image capturing unit 400 and assesses focus quality. Furthermore, the controller 100 processes images, which satisfy a pre-determined focus threshold, to perform the iris recognition.

Figure 2:
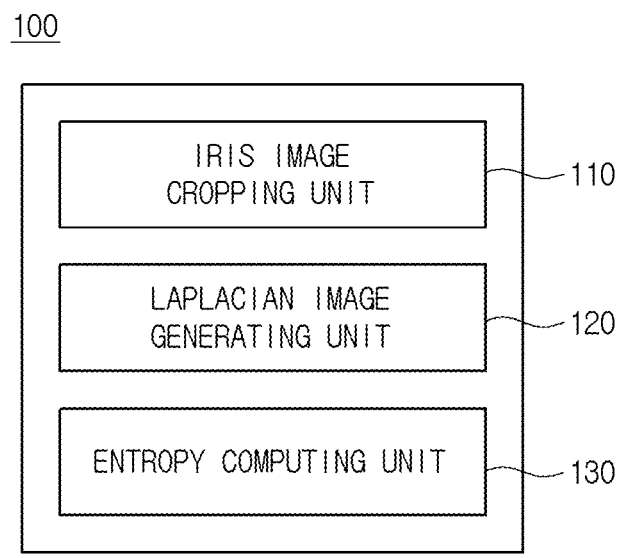
FIG. 2 is a block diagram of a controller according to an embodiment.

FIG. 2 is a block diagram of a controller 100 according to an embodiment.

Referring to FIG. 2, the controller 100 according to an embodiment includes an iris image cropping unit 110, a Laplacian image generating unit 120, and an entropy computing unit 130 in order to assess the focus quality of iris portion in the captured images.

Dividing the configuration of the controller 100 as shown in FIG. 2 is for the convenience of explanation and it may be good to understand as a part of a series of processes performed by a microprocessor.

At first, the iris image cropping unit 110 searches for iris position in the captured iris image and generates a cropped iris image. The cropped iris image includes a region around the eye in the captured image. In more detail, it includes a region around the iris in the captured image.

In order to achieve high accuracy of iris recognition, it is important to determine whether an eye, more specifically iris, is properly focused rather than the captured entire image. For example, eyeglasses frame, eyebrow, eyelashes or etc., would have an impact on the focus assessment if the captured entire image had any of them. It means that they may affect the accuracy of focus assessment for the iris in the image. So it is necessary to exclude these kinds of objects from the focus quality assessment.

To this end, the iris image cropping unit 110 crops the area including the iris in the captured entire image. This iris image cropping unit 110 generates a cropped rectilinear iris image using an iris detector. In addition, when the iris region includes eyelashes or eyelids, the iris image cropping unit 110 detects them. The entropy computing unit 130 excludes them when it calculates an entropy value.

The Laplacian image generating unit 120 produces a Laplacian image based on the cropped iris image.

In an embodiment, the Laplacian image generating unit 120 produces a blurred image of the cropped iris image. In detail, the blurred image may be a Gaussian image generated by a Gaussian filter which applies to the cropped iris image.

In addition, in an embodiment, the Laplacian image generating unit 120 compares the cropped iris image with the blurred image and then generates the Laplacian image. In detail, the Laplacian image generating unit 120 produces the Laplacian image by computing pixel by pixel difference between the cropped iris image and the blurred image.

The entropy computing unit 130 computes the entropy of the pixel value distribution of the Laplacian image to assess focus quality and then it can be converted to a focus value.

In a detailed embodiment, the entropy computing unit 130 creates a histogram of the Laplacian image.

At this point, any objects affecting focus assessment such as eyelid and eyelashes are removed from the Laplacian image and so the entropy computing unit 130 creates the histogram of pixel values of only the region of interest. Accordingly, it is expected that it increases the correlation between the entropy value and the focus quality of iris by extracting the entropy value from the histogram of the image related to the iris region.

The entropy provides an appropriate measure of the randomness of pixel value distribution of the Laplacian image. The entropy value can be used to calculate the focus quality of the cropped iris image. By the way, the focus quality is highly correlated to the accuracy of iris recognition. So a reference entropy value (or reference focus score) can be determined to achieve the expected accuracy of iris recognition.

For example, in an iris recognition system requiring a high security level, an entropy value is extracted from the good quality images with the expected accuracy of iris recognition and then the entropy value can be used as a reference entropy value to assess the quality of the captured iris image.

The controller 100 checks that the captured image meets the pre-determined reference entropy value and recognizes the iris of the qualified image to achieve the high accuracy of iris recognition. In other words, in the embodiments, only the image with the entropy value, which is greater than the reference entropy value, is used for iris recognition and the high security of iris recognition system can be achieved.

Figure 3:
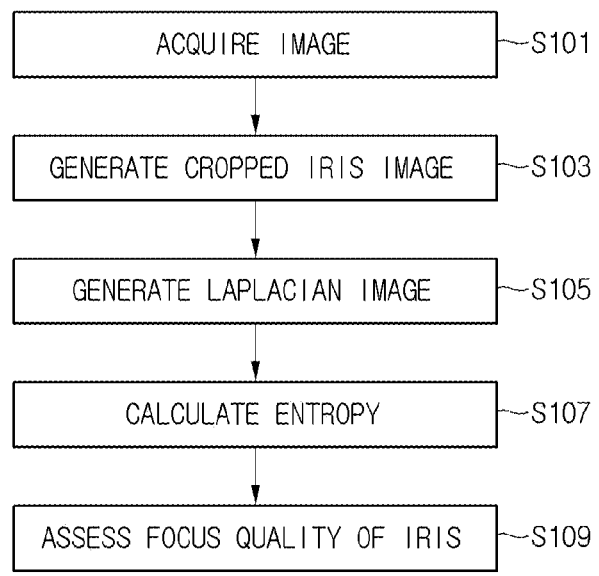
FIG. 3 is a flowchart of assessing the focus quality for iris recognition according to an embodiment.

FIG. 3 is a flowchart of assessing the focus quality for iris recognition according to an embodiment.

Figure 4:
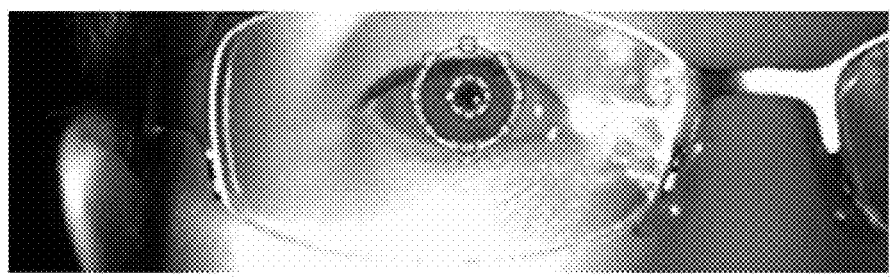
FIG. 4 is a captured image by the image capturing unit and the result of iris localization of the captured image.
Figure 5:
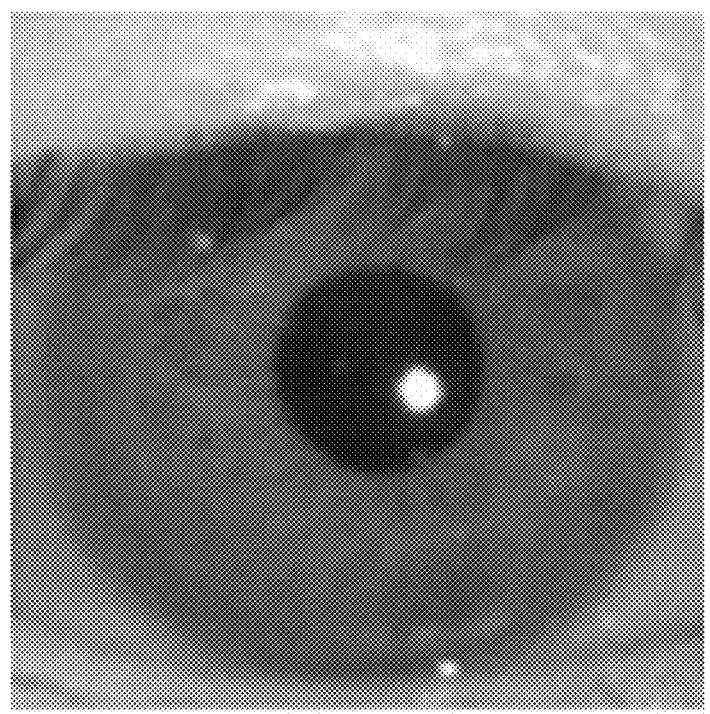
FIG. 5 is a cropped iris image of the captured image.
Figure 6:
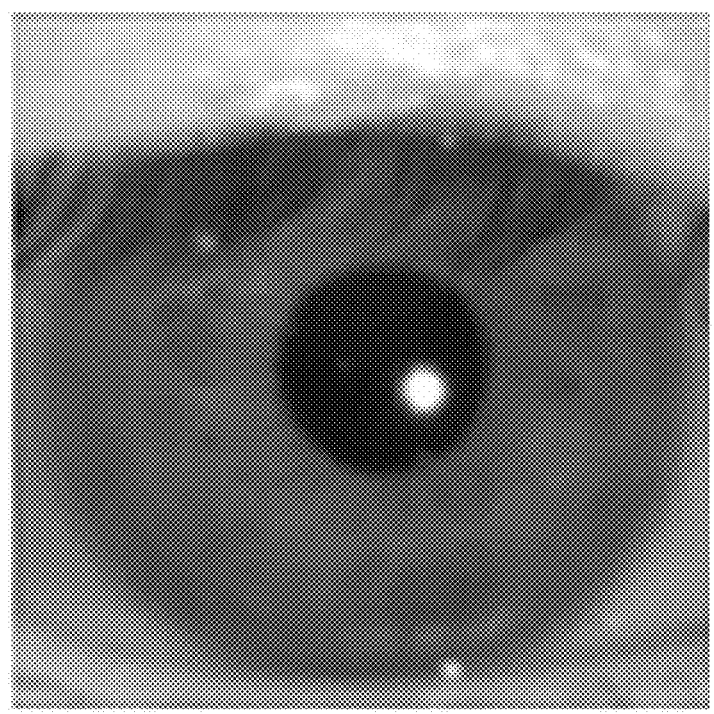
FIG. 6 is a blurred image of the cropped iris image.
Figure 7:
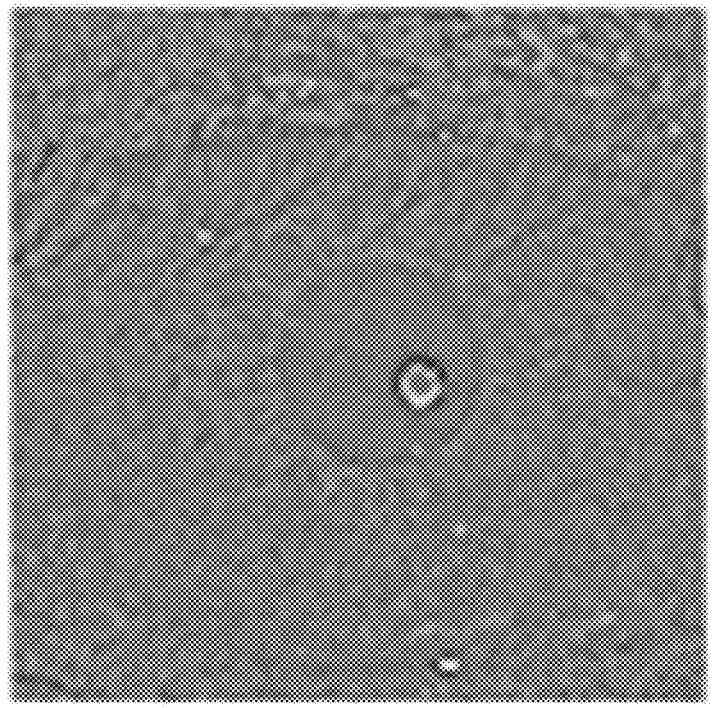
FIG. 7 is a Laplacian image of the cropped iris image.

FIG. 4 is an example of image acquired by an image capturing unit 400 and the result of iris localization of the captured image, FIG. 5 is a cropped iris image of the acquired image, FIG. 6 is a blurred image of the cropped iris image, and FIG. 7 is a Laplacian image of the cropped iris image.

Hereinafter, an operation of the iris recognition apparatus 10 is described in detail with reference to FIGS. 3 to 7.

The illuminating unit 300 illuminates the eyes of a subject. The image capturing unit 400 acquires an image of the subject (operation S101).

The controller 100 generates a cropped iris image from the captured image (operation S103).

The controller 100 may crop just the center region of the captured image to generate a cropped iris image. However, the size of an iris in an image depends on the distance of image capturing and even the iris portion of the image may not be centered in the image. If just the center region with fixed size was cropped from the captured image, an unnecessary object might be included or the part of iris might be cut away in the cropped image. It may affect the accuracy of iris focus quality assessment.

In order to address this issue, the controller 100 has the iris image cropping unit 110. In an embodiment, the iris image cropping unit 110 detects an iris in the captured image and generates the cropped iris image.

In other words, in an embodiment, the iris image cropping unit 110 generates a cropped image including iris area to calculate focus quality only on the region of interest for iris recognition. Further processing for iris recognition would be effective and efficient if the iris in good focus was obtained by assessing focus quality only on iris area.

In addition, the controller 100 generates a Laplacian image based on the cropped iris image (operation S105).

In an embodiment, the controller 100 generates a blurred image of the cropped iris image. For example, the Laplacian image generating unit 120 produces a blurred image based on the cropped iris image using a Gaussian filter.

Thereafter, the Laplacian image generating unit 120 generates the Laplacian image by computing pixel by pixel difference between the blurred images and the cropped iris image.

As described above, the entropy of pixel value distribution of the Laplacian image is measured to assess focus quality of the cropped iris image.

To this end, the controller 100 calculates an entropy value of the Laplacian image (operation S107). It is given by $$\text{entropy} = -\sum_{i=0}^{255} f(i) \log_2 f(i) \quad (1)$$

where i is each gray level in the histogram of the Laplacian image and f(i) is the observed frequency of occurrence.

Equation (1) is used to calculate the entropy value of an image.

The entropy computing unit 130 of the controller 100 calculates the entropy value of the Laplacian image using Equation (1). The entropy provides an appropriate measure of the randomness of pixel value distribution of the Laplacian image and the entropy value can be used to calculate the focus quality of the cropped iris image.

In a detailed embodiment, the entropy computing unit 130 creates a histogram of the Laplacian image and calculates the entropy value using the Equation (1).

The controller 100 may normalize the calculated entropy value to generate a normalized focus score. For example, the controller 100 generates focus score in the range of 0 to 100 by normalizing the entropy value.

The controller 100 achieves the high accuracy of iris recognition by checking the image quality referring to the pre-determined reference focus score and recognizing the iris of the image in good quality. For example, when the pre-determined reference focus score is 80, the controller 100 determines that the image is in good focus if the focus score of the image is 80 or greater.

In the embodiment, the high accuracy of iris recognition can be achieved by assessing focus quality based on the entropy of Laplacian image and using the image in good focus for iris recognition.

Figure 8:
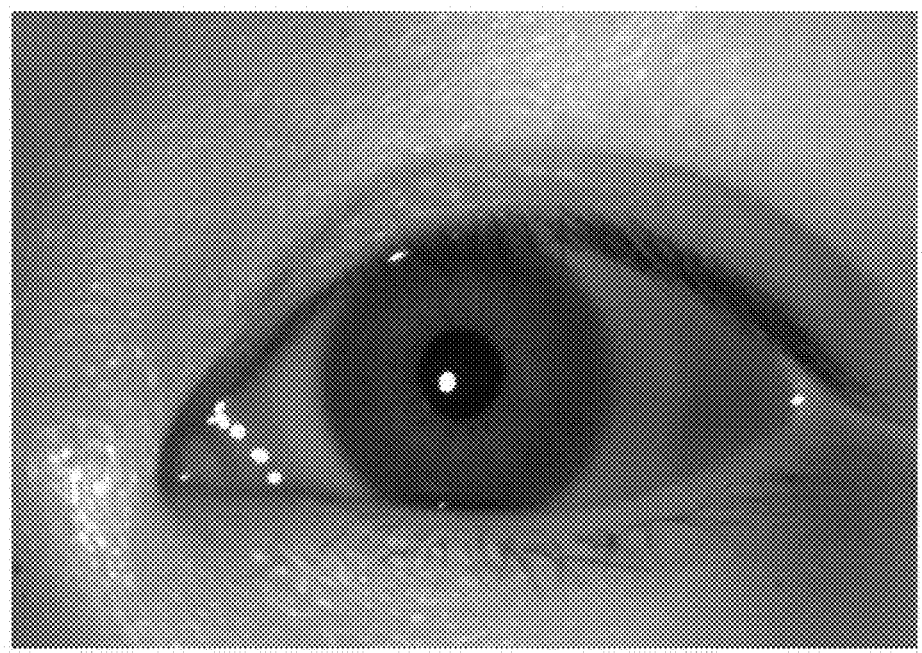
FIG. 8 is an iris image in poor focus.
Figure 9:
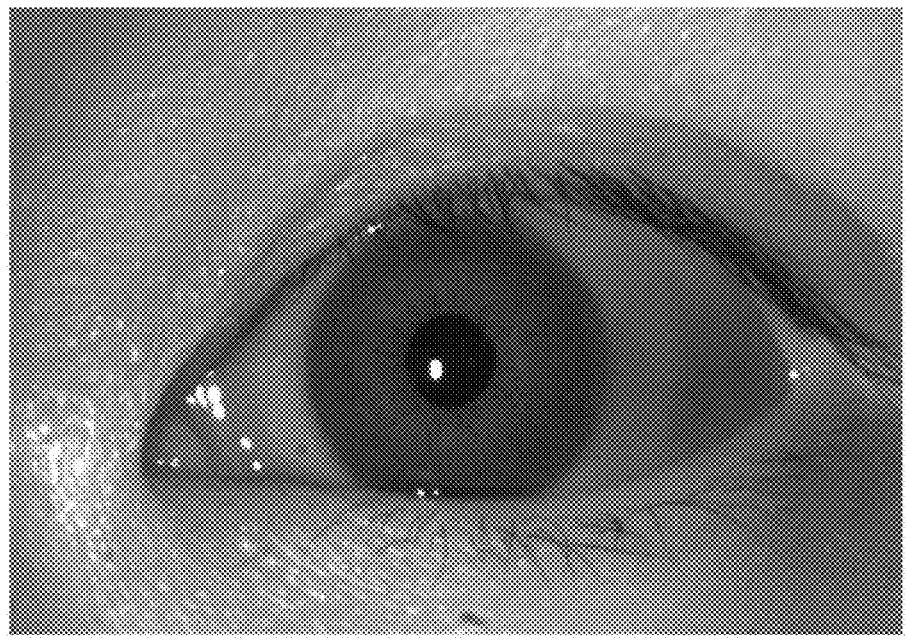
FIG. 9 is an iris image in good focus.

FIG. 8 is an iris image in poor focus, and FIG. 9 is an iris image in good focus.

According to embodiments, the normalized focus score based on the entropy value of the cropped iris image of FIG. 8 is 60, and that of the cropped iris image of FIG. 9 is 93.

The matching accuracy of the iris image in poor focus like FIG. 8 tends to be lower and that of the iris image in good focus like FIG. 9 tends to be higher.

Accordingly, the iris recognition method according to embodiments is advantageous in that high accuracy and efficiency of iris recognition can be achieved by avoiding potentially unnecessary data handling in the whole process of iris recognition and processing only iris image in good focus for identification, particularly on iris, among captured images.

Furthermore, the method is advantageous in that focus quality can be assessed very fast due to simple calculation method.

Hereinafter, it describes two embodiments using this iris focus quality assessment method for iris recognition.

Figure 10:
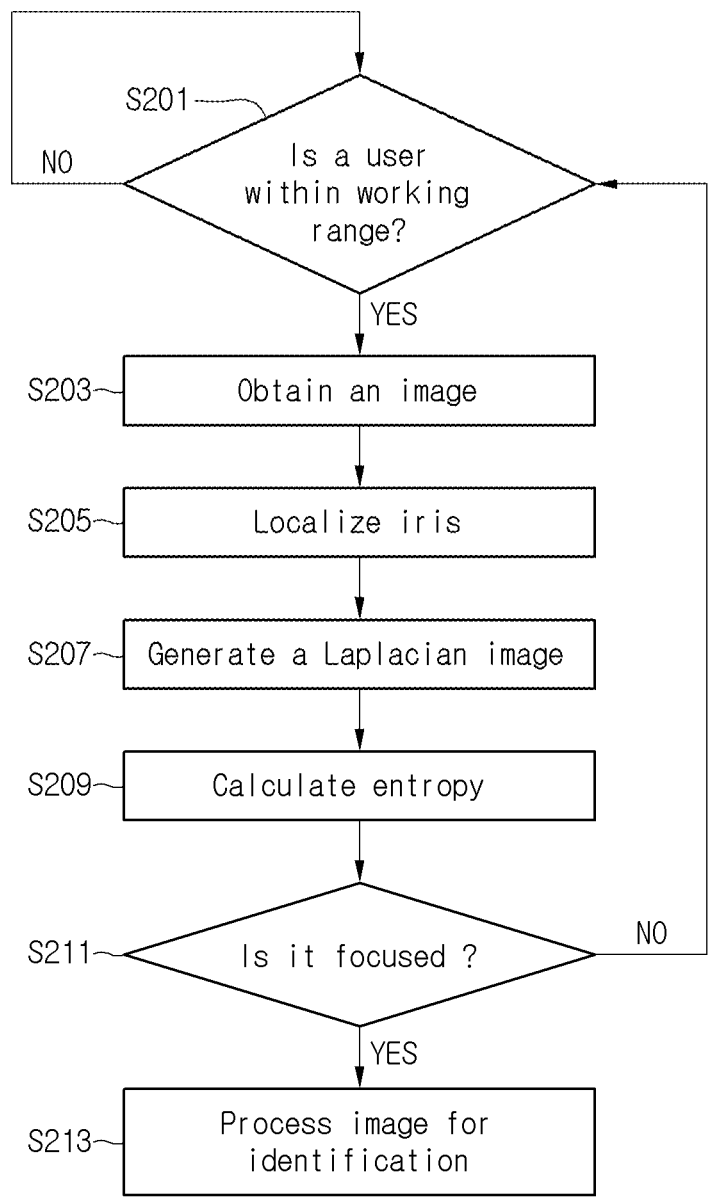
FIG. 10 is a flowchart of an iris recognition method according to the first embodiment.

FIG. 10 is a flowchart of an iris recognition method according to the first embodiment.

At first, it is determined whether a user is within the working range of the iris recognition apparatus 10 (operation S201).

When the user is in the working range, the image capturing unit 400 obtains one image of the subject (operation S203).

Thereafter, the focus quality is assessed (operation S211) for the captured image through iris localization (operation S205), Laplacian image generation (operation S207), and entropy value calculation (operation S209).

The process of focus quality assessment has been described and so duplicate description is omitted.

The controller 100 computes an entropy value to assess focus quality and it can be converted to a normalized focus score. It is determined that the captured image is in good focus and appropriate for iris recognition if the entropy value meets the requirement of focus quality.

When the entropy value is greater than the pre-determined entropy value, the controller 100 determines the focus quality of the captured iris image is acceptable for further processing and it performs the iris recognition (operation S213).

When the entropy value is smaller than the pre-determined entropy value, it is determined that the captured image is out of focus and an image of the subject is captured again.

It is determined whether a captured image is suitable for further processing for iris recognition by the iris recognition method according to the first embodiment. Namely, iris recognition system doesn't need to process unnecessary data and it improves the overall processing speed of iris recognition system. Finally, the high efficiency of iris recognition system can be achieved.

Figure 11:
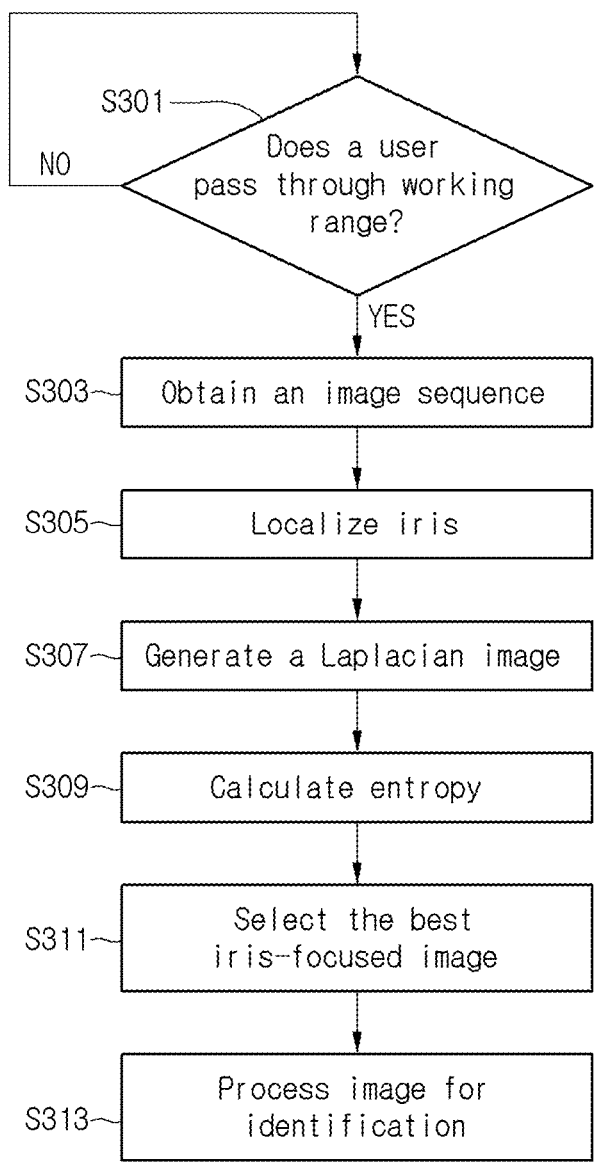
FIG. 11 is a flowchart of an iris recognition method according to the second embodiment.

FIG. 11 is a flowchart of an iris recognition method according to the second embodiment.

At first, it is determined whether a user passes through the working range of the iris recognition apparatus 10 (operation S301).

When the user passes through the working range, the image capturing unit 400 obtains an image sequence of the subject (operation S303).

Then, iris localization (operation S305), Laplacian image generation (operation S307), and entropy value calculation (operation 5309) are performed on the captured image sequence.

Then, the controller 100 selects one image, which has the highest entropy value, from the image sequence to do further processing for iris recognition (operation S311).

In other words, the controller 100 considers the image having the highest entropy value as one having the highest iris quality from the focus quality perspective.

Then, the controller 100 performs further processing on the selected image for iris recognition (operation S313).

According to the second embodiment, the accuracy of iris recognition can be improved by selecting the image having the highest focus quality from the image sequence and performing iris recognition only with the selected image.

In conclusion, the iris recognition method according to embodiments is advantageous in that high accuracy and efficiency of iris recognition can be achieved by avoiding potentially unnecessary data handling in the whole process of iris recognition and processing only iris image in good focus for identification, particularly on iris, among captured images.

In detail, in the embodiments, an iris recognition system with high security can be implemented by checking if the image meets the pre-determined reference entropy value (or pre-determined reference focus score) and then using only the qualified image for iris recognition. In other words, the best performance of iris recognition system can be expected by using good quality image.

From the accuracy point of view, the high accuracy of iris recognition can be achieved by performing the iris recognition on the qualified image which is suitable for further processing for iris recognition.

From the efficiency point of view, the processing speed can be improved by performing the iris recognition on the qualified image. Namely, iris recognition system doesn't need to process disqualified images for identification and it improves the overall processing speed of iris recognition system. Finally, the high efficiency of iris recognition system can be achieved.

In the foregoing, features, structures, or effects described in connection with embodiments are included in at least one embodiment, and are not necessarily limited to one embodiment. Furthermore, the exemplified features, structures, or effects in various embodiments can be combined and modified by those skilled in the art. Thus, a combination of these, and information related to the modification will be construed as being included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An iris recognition apparatus recognizing an iris of an eye, comprising:
    an image capturing unit to obtain an image of the iris; and
    a controller to assess the focus quality of an iris region in the iris image and determine an iris recognition target image,
    wherein the controller comprising;
    an iris image cropping unit to produce a cropped iris image based on the captured iris image; and
    a Laplacian image generating unit to produce a Laplacian image based on the cropped iris image and assess the focus quality of the iris region,
    wherein the iris image cropping unit searches for an iris position in the captured iris image and generates the cropped iris image,
    wherein the Laplacian image generating unit produces a blurred image of the cropped iris image and then generates the Laplacian image by computing pixel-by-pixel difference between the cropped iris image and the blurred image of it,
    wherein the controller comprises a Laplacian image generating unit to produce a Laplacian image based on the cropped iris image and assess the focus quality of the iris region, and
    wherein the controller further comprises an entropy computing unit to calculate an entropy value of the Laplacian image and assess the focus quality of the iris region.

2. The iris recognition apparatus according to claim 1, wherein the blurred image is generated using a Gaussian filter.

3. The iris recognition apparatus according to claim 1, wherein the entropy computing unit creates a histogram of the Laplacian image and calculates the entropy value.

4. The iris recognition apparatus according to claim 3, wherein the entropy computing unit normalizes the entropy value to create a normalized focus score.

5. An operating method of an iris recognition apparatus recognizing an iris of an eye, the operating method comprising:
    capturing an iris image of the eye; and assessing focus quality of an iris region in the captured iris image; and determining whether the captured iris image is suitable for iris recognition based on the assessed focus quality:
    wherein the assessing focus quality comprises the step of generating a cropped iris image based on an iris position in the captured iris image, wherein the assessing focus quality further comprises the step of generating a Laplacian image based on the cropped iris image and produces a blurred image of the cropped iris image and then generates the Laplacian image by computing pixel-by-pixel difference between the cropped iris image and the blurred image of it, wherein the assessing focus quality further comprises the step of calculating an entropy value of the Laplacian image and assessing the focus quality of the iris region, and wherein the method is performed using a computer or processor.

6. The operating method according to claim 5, further comprising capturing an iris image of the subject again, when the captured iris image is not suitable for iris recognition.

7. The iris recognition apparatus according to claim 3, wherein the entropy computing unit calculates the entropy value given by $$\text{entropy} = -\sum_{i=0}^{255} f(i) \log_2 f(i)$$

where i is each gray level in the histogram of the Laplacian image and f(i) is the observed frequency of occurrence.

* * * * *